Figure 3:
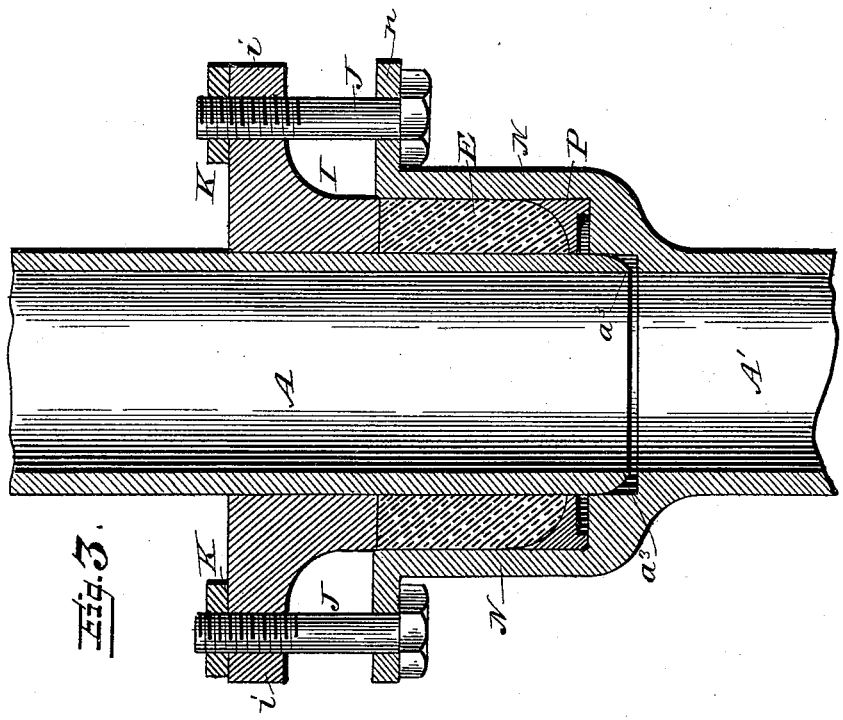

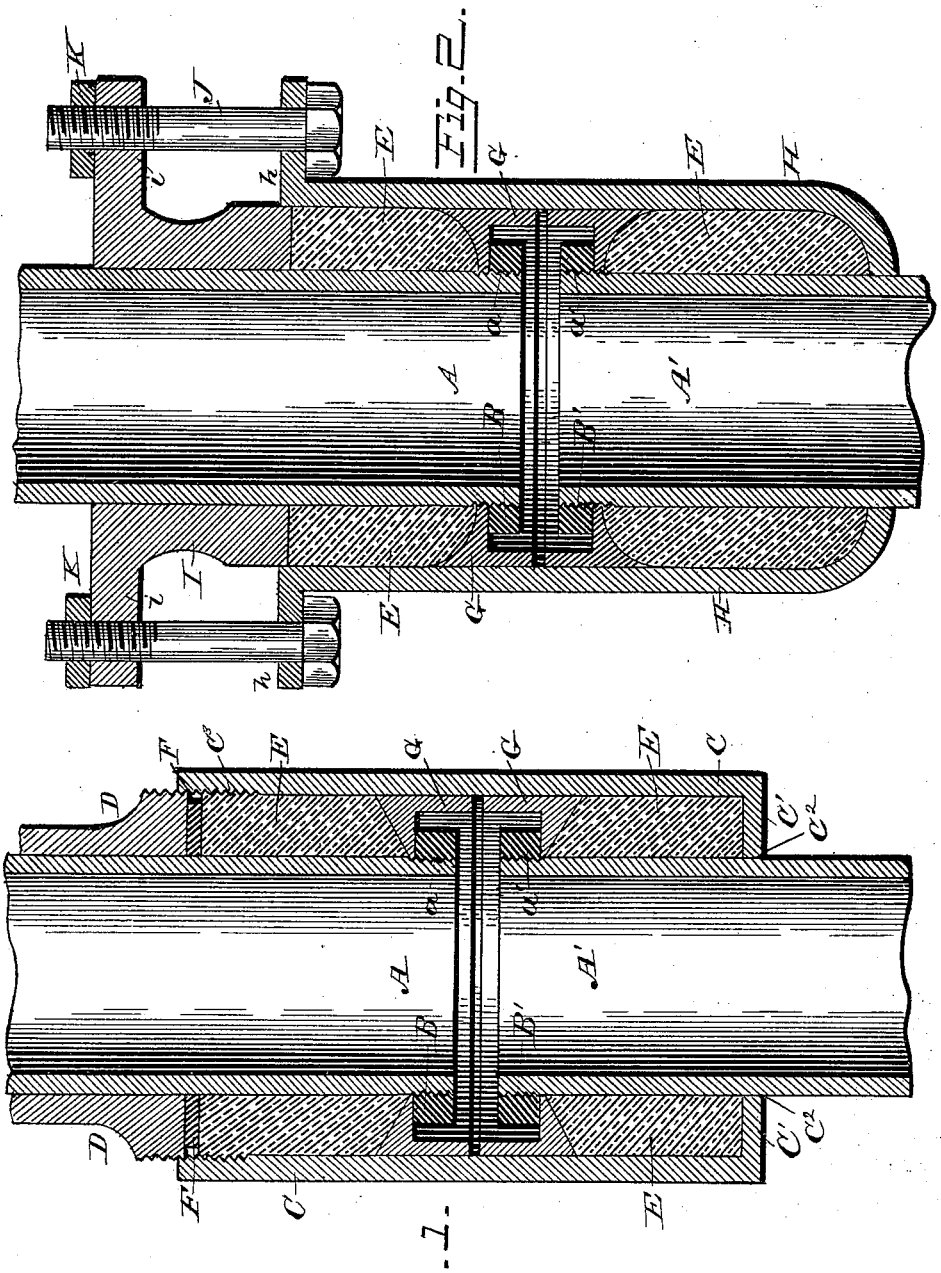

(No Model.) 2 Sheets—Sheet 2.
S. R. DRESSER.
PIPE COUPLING.

No. 350,421. Patented Oct. 5, 1886.

WITNESSES:
L. C. Hills,
E. C. Wurdeman.

INVENTOR
Solomon R. Dresser
BY James C. Bryce
his ATTORNEY

UNITED STATES PATENT OFFICE.

SOLOMON R. DRESSER, OF BRADFORD, PENNSYLVANIA.

PIPE-COUPLING.

SPECIFICATION forming part of Letters Patent No. 350,421, dated October 5, 1886.

Application filed July 13, 1885. Serial No. 171,467. (No model.)

*To all whom it may concern:*

Be it known that I, SOLOMON R. DRESSER, a citizen of the United States, residing at Bradford, in the county of McKean and State of Pennsylvania, have invented certain new and useful Improvements in Pipe-Couplings; and I do hereby declare the following to be a full, clear, and exact description of the invention, such as will enable others skilled in the art to which it appertains to make and use the same.

The object of my invention is to provide a self-packing coupling for the ends of tubes.

The accompanying drawings show the invention and different ways of applying it to different pipes.

Figure 1 is a sectional view applied to ordinary wrought-iron steam, gas, or oil pipe, with a screw-threaded gland. Fig. 2 is a sectional view of the invention applied to the same kind of pipe, with a modification of the form of packing and the gland and box drawn together by bolts and nuts. Fig. 3 is a sectional view of my invention applied to cast-iron water-pipes.

The main feature of my invention is to provide in the coupling a recess for a rubber or other elastic packing and then to furnish and adapt means to compress such packing by means of the force or power in the inside of the pipes and force the packing into all the apertures of the joint, thus securing a perfectly tight joint.

In all the figures, A and A' represent the pipes to be joined.

B and B' are thread-protectors screwed on the threaded ends $a$ $a'$ of such pipes. If the pipes are not screw-threaded these protectors B and B' are not necessary.

E represents the packing, which will generally be made of rubber; but asbestus or hemp or any other fibrous or elastic packing may be used.

C in Fig. 1 is a sleeve made larger than the tubes, and having an interior lip, $c'$, pierced with an aperture, $c^2$, through which the pipes are introduced. The sleeve C is screw-threaded at its upper end at $c^3$, and the follower or gland D screws into it.

F is a metal washer interposed between the gland D and the packing E. When the gland D is screwed up, the packing E is compressed against the pipe and the sleeve.

The packing is made (in this form, Fig. 1) in two parts, one above and the other below the division of the pipes A A', and the lower end of the upper part and the upper end of the lower part are beveled, as shown. A ring, G, fits under the curved end of the packing and receives the action of the liquid, gas, or steam, which escapes through the interval between the contiguous ends of the pipe. This ring is a mere protector for said packing and not at all necessary to the compressing action of the steam thereon. The annular thread-protectors B B' serve as stops for said packing and said rings G, the latter being recessed to slide over them and to allow the action of steam, as stated. The sleeve C is put over the end of the pipe, the packing E, and the packing-ring G also, and the thread-protector B' is then screwed on. Besides protecting the thread on the end of the pipe, the protector B' also aids in keeping the packing-ring G in its place. The gland D, washer F, upper packing, E, and packing-ring G are put in the other pipe, A, and the thread-protector B screwed on. The ends of the pipe are brought together and the gland D is firmly screwed into the sleeve C. The packing E E is thus compressed between the sleeve and the tube. When the line of pipe is completed, and the oil or gas or other substance under pressure is let into the line, some portion will press against the packing-rings G G and force them against the packing E, compressing it still more strongly against the pipes and the sleeve, thus insuring a perfectly tight joint, as the greater the pressure the more firmly will the packing be compressed.

The form shown in Fig. 2 is substantially the same as that shown in Fig. 1. The sleeve H has a flange, $h$, and the gland I has a flange, $i$, and through these flanges the bolts J J are inserted and the flanges are drawn together by the nuts K. As these flanges are only for the purpose of forming points for the insertion of the bolts they need not be continuous. Small lugs—two, three, or more—may be used when preferred.

In Fig. 3 my invention is shown as applied to cast-iron hydraulic pipes with a spigot and faucet joint. The faucet or bell-shaped end has lugs or a flange, $n$, and the spigot end is beveled off, as shown at $a^3$. The follower or gland I has a corresponding flange or lugs, *i*, and the bolt and nut J K press the follower into the bell, compressing the packing E. The lower end of the packing is beveled, and the packing-ring P is interposed between the packing E and the bottom of the bell N. Pressure of the gas or liquid in the pipe drives the packing-ring P against the packing E and compresses it against the pipe and the bell.

In using this form of coupling it is not necessary that the ends of the pipes should abut. In some cases it will be better to leave from a fourth to a half of an inch between them.

Besides securing a perfectly tight joint this means of uniting pipes makes an expansion-joint, as when the pipes expand or contract by temperature the ends of the pipes can slip in the packing E without affecting the packing.

What I claim as my invention, and desire to secure by Letters Patent, is—

1. In a pipe-coupling, the combination of an elastic packing with a follower bearing against one end of it and a loose ring in contact with the other end, said ring being exposed to the action of the steam or liquid within the pipes, substantially as set forth.

2. In combination with sleeve C and pipes A A', having their joint inclosed in said sleeve, a packing within said sleeve on one side of said joint, a ring fastened to the end of one of said pipes, and a loose ring bearing against said packing recessed to allow for the expansion and contraction of the pipes, leaving space between it and said fixed ring for the action of the steam on said movable ring, substantially as set forth.

SOLOMON R. DRESSER.

Witnesses:
KENTON SAULNIER,
JAMES C. BOYCE.